United States Patent [19]
Leitner et al.

[11] 3,988,577
[45] Oct. 26, 1976

[54] AUTOMATED ENERGY SYSTEMS WITH COMPUTER COMPATIBILITY

[75] Inventors: Frank Wilhite Leitner; Walter Louis Baker, III, both of Charlotte; Jeter Olive Barker, Jr., Matthews, all of N.C.; Jorgen Walther Andersen, Silver Spring, Md.

[73] Assignee: Automated Energy Systems, Inc., Matthews, N.C.

[22] Filed: Feb. 24, 1975

[21] Appl. No.: 552,338

Related U.S. Application Data

[63] Continuation of Ser. No. 243,952, April 14, 1972, abandoned.

[52] U.S. Cl. ........................... 235/151.1; 219/506; 340/213 Q; 235/92 CT; 235/92 MT
[51] Int. Cl.² ........................................ G05D 23/19
[58] Field of Search ................... 219/501; 235/150.1

[56] References Cited
UNITED STATES PATENTS

| | | | |
|---|---|---|---|
| 3,265,873 | 8/1966 | Sawyer | 235/151.1 |
| 3,479,493 | 11/1969 | Jacques et al. | 235/151.1 |
| 3,584,291 | 6/1971 | Budniak | 219/501 |
| 3,586,830 | 6/1971 | Leitner et al. | 219/501 |
| 3,644,897 | 2/1972 | McCrea | 340/172.5 |
| 3,798,424 | 3/1974 | Freitas et al. | 235/150.1 |

*Primary Examiner*—Eugene G. Botz
*Attorney, Agent, or Firm*—Wilfred G. Caldwell

[57] ABSTRACT

The invention comprises apparatus and methods for controlling and monitoring most of the energy systems used by man. An energy level to be maintained is predetermined and electronically established as a time interval. Sensing means are exposed to the actual energy level for influencing the parameter value of the sensing means in accordance with the sensed energy level. The parameter value is converted to a digital pulse train with the time period between pulses being proportional to the parameter value being sensed. A reference or standard time base is generated, from which a measure of time for the period is obtained. This measure of time is compared against the time interval to determine if energy need be applied to reach the predetermined energy level, if alarm is required and to display a digital or numerical representation of the actual energy level.

36 Claims, 12 Drawing Figures

PRESSURE AS A PARAMETER TO PERIOD

DIRECT PERIOD TRANSDUCER

INDIRECT PERIOD TRANSDUCER

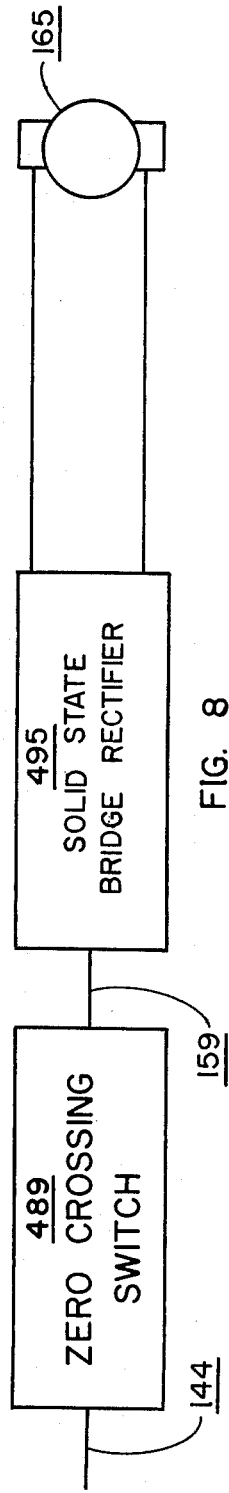
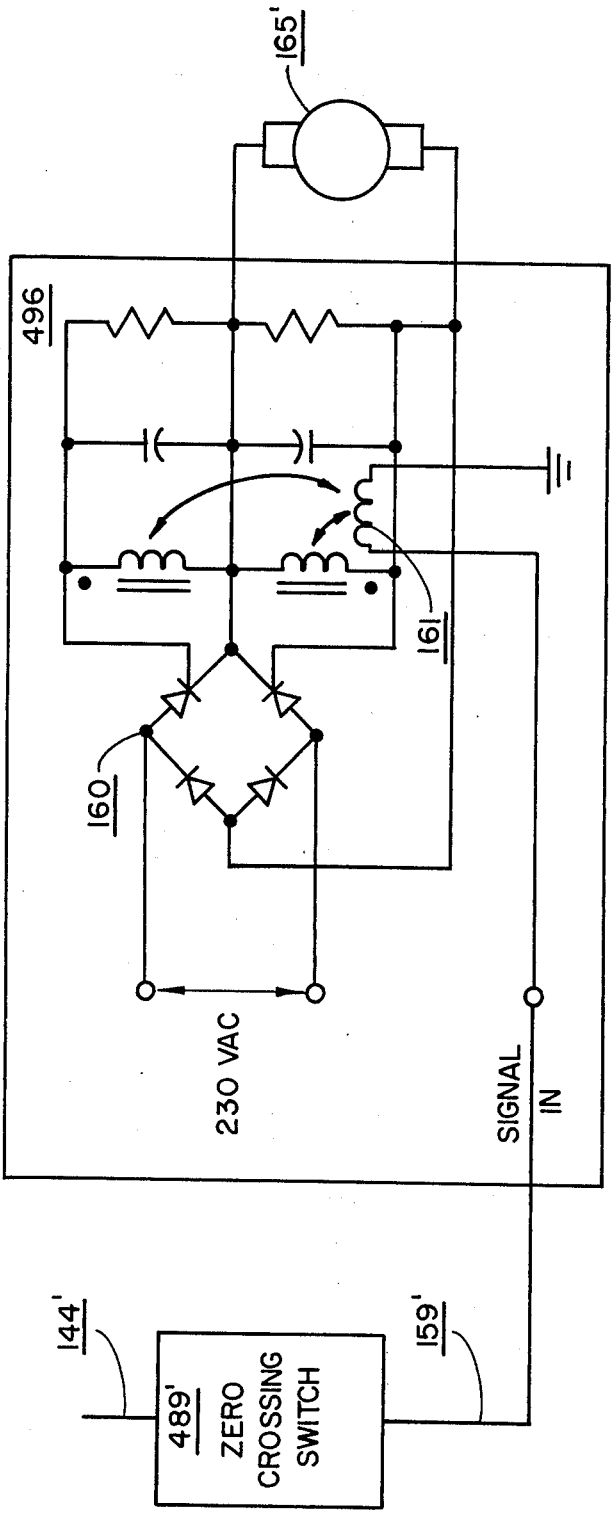

AUTOMATED ENERGY SYSTEMS WITH COMPUTER COMPATIBILITY

This is a continuation of abandoned application Ser. No. 243,952, filed Apr. 14, 1972.

The present invention relates to apparatus and methods for the control of energy application (usually to a load) and/or monitoring and alarming, all relative to pre-determined energy levels, which may be set. Basically, an energy parameter is applied to a load to maintain a fixed energy level at the load. Most of the circuitry and apparatus is able to handle most energy forms, permitting the use of many various types of parameters of energies. Usually, only the transducer need be changed to handle the different energy systems known to man. The various transducer output signals may be multiplexed for control purposes relative to one or more parameter inputs. Direct period transducers are typified by a pressure sensitive crystal directly delivering an output which includes a time base, i.e., megahertz, wherein the frequency changes as pressure applied to the crystal changes. The indirect period transducers require a sensor plus a period converter. For example, the use of a pressure sensitive strain gauge requires a resistance to period converter because it is the resistance parameter which is varying in accordance with the strain sensed. In either event, a pulse train output is obtained.

Viewed somewhat differently, the present invention comprises a special purpose computer capable of accommodating a great number of variables for control and monitoring purposes relative to predetermined energy levels without recourse to large scale general purpose computers, and wherein the basic circuitry enables the control regardless of the different parameter inputs. For example, energy levels within the contemplation of the present invention may be derived from e.g.:

temperature
pressure
position
moisture content
speed
angular velocity
crystal vibration
light
color, or derivative thereof or any variable which can be measured in terms of a predetermined characteristic, such as an energy level. The present invention may be employed in the measurement field to determine the efficiency of energy applied to a load or to a given use, or it may be applied as an efficiency measure or basis for handling parameters appearing in various formulae, singly or in relation to other parameters of variables.

The invention uses the period of a digital pulse train as a comparison standard by converting same to a time increment and logically counting it off against a set or predetermined energy level for the application of further energy to attain the preset standard or the elimination of the application of further energy if the preset level has been attained. A transducer is provided for each energy system, the purpose of which is to convert a sensed energy level to a digital pulse train for input to the common circuitry of the invention. From this pulse train the period is derived by metering the time interval between two pulses. The metering is achieved by gating a time passed frequency or clock to a counter for the interval of time corresponding to the parameter period. The counter has been previously set to a count increasing to the predetermined energy level and it is down-counted from that level by the instantaneous parameter period in accordance with the clock pulses passed through the gate during the sensed period. If the stored count is greater than the period count, the down counter does not reach zero and the circuitry responsible for the application of energy to the load or elsewhere is programed to maintain full energy application. However, when the parameter or period count exceeds the stored count corresponding to the predetermined energy level, then the command is no longer present, thus no further energy application is made to the load.

The system provides for the application of energy in discrete amounts calculated to be just sufficient to nudge the load toward set point with sampling and logic being achieved during each discrete energy burst to determine if further energy is necessary to reach set point.

A memory is provided to insure that continuous energy application to the load may be had due to the high sampling rate in the event the load is below set point.

Normally, the pickup transducer characteristic is a non-linear function relative to the energy level parameter change. The system incorporates a read only memory as a storehouse point by point for the non-linear characteristic which must be known or predictable. Stated another way, the ROM is used to store, point by point, the predictable non-linear characteristic of the parameter to period transducer. To avoid the use of calibrated sensors a ratio may be stored in the ROM and this is explained by the fact that the point by point stored characteristic is the ratio of the transducer output value (period) at a parameter value relative to the transducer output value (period) at a reference parameter value.

A plurality of input signals may be grouped plexed wherein different energy systems are handled by the various groups but preferably the energy system is the same within each group.

Finally, it should be noted that both direct and indirect input or sensing of transducer devices may be employed without change of the basic system. A resistance to period transducer capable of providing the transducer digital pulse train really comprises an analog to digital converter which may include a temperature sensitive resistor connected to control the frequency of an oscillator. Such an indirect converter may readily cope with energy systems for maintaining temperature, pressure or position.

Another example of indirect type analog to digital converters comprises the voltage to period transducer which is useful in connection with systems controlling angular velocity, moisture content and the like wherein a magnetic tachometer or a microwave attenuation device are especially useful.

Examples of a direct analog to digital converter include such devices as photo-tachometer (photo pulse train generator) and the use of direct crystal vibrations. Basically, the direct transducer includes time as the base against which its energy system is defined and thus it may be seen that a crystal when compressed changes its output frequency, vibration or period.

By incorporating multiplexing techniques, a great quantity of stations may be monitored or controlled wherein identical parameters, such as temperature are supervised at all stations and/or additional parameters such as pressure, speed or the like are supervised or monitored at one or more stations. For instance, one of the many stations to be controlled and monitored could be the input to an extruder head where one or many strands of a product could be flowing, such as in the extrusion of plastic fibers where a head may have as many as a hundred extrusion ports, the object being to maintain a constant flow of plastic polymer at a specific temperature.

The temperature can be controlled and/or monitored and it can be assumed that the flow will be maintained properly, provided the known or input pressure is within tolerable limits. In this example, the area of the ports determines the volume that is flowing at the given temperature and pressure. If there is a rupture or a restriction of a port or ports, such that the pressure increases or decreases beyond the allowable limits, and if the sensed temperature is proper, it is sensed that the flow (pressure) is improper and consequently, the product is improper.

In a system of many such extrusion points (heads) in a processing plant these points or stations are usually grouped in banks of 8, 16 or 32 and signals therefrom are multiplexed into a logic controller and/or monitor. It has been found that a read only memory (ROM) may be used for each group of stations for controlling and monitoring temperatures and a second ROM may be used for the same group where pressures are monitored. If, e.g., 16 stations are monitored and controlled, the temperature ROM serves the 16 stations, and a pressure ROM serves the same stations. The control and monitoring system is deemed as having two channels whereby position "one" of channel 1 and position "one" of channel 2 and position "sixteen" of channel 1 and position "sixteen" of channel 2 are scanned simultaneously. If the temperature is below set point, the control portion of the temperature monitoring channel provides an increment of energy to the polymer to increase its temperature. At the same instant of time, in the pressure channel, if the pressure were above or below prescribed alarm set points, an alarm condition is sounded with possible automatic shut-off of the station. Here, it is shown that 16 stations have temperature monitoring and control with an overriding pressure monitoring system.

Another advantage is that, from a practical standpoint, these extrusion ports, over a period of time, will become restricted slowly, and the pressure will rise slowly. When the pressure reaches a point beyond allowable tolerances, i.e., a predetermined allowable condition, the pressure head could be dismantled for cleaning and subsequent reinstallation. Another reason for pressure increase is that a certain number of the ports could become clogged. It is understood that this system could be multiplexed with any number of channels to satisfy any number of stations.

Another similar example is where a process is using steam as the energy source for doing work. When using super heated steam, it is important to know not only the temperatures at the input and outlet ports where work is being accomplished, but also the pressure and the moisture content of the steam. Temperatures and pressures can be handled similar to the examples cited above and moisture can be determined by projecting a microwave signal through the steam, and collecting the microwave as an attenuated signal residue which can be sensed by a voltage level and converted to a period of time for further control or monitoring purposes.

The design of thermal energy systems and controls therefor encompasses the following considerations:

1. The thermal capacitance of the system is determined. This is related to the volume of the material and the specific heat of the material times the specific gravity of the material.
2. A heating element is closely coupled from a standpoint of thermal energy transfer to the load to be heated with a wattage capacity such that the heater can accelerate the temperature of the load at a rate of 2° C. per second.
3. The sensor is located in a position relative to the heater and load to simulate and anticipate the temperature of the working surface of the heater and the response is such that it will change its temperature in the thermal system at a rate of 2° C. in 30 milliseconds.
4. When it is known that the desired control temperature of the sensor is below set point, a minimum burst of energy (1/60 of a second (16.6 milliseconds) with a 60Hz power system) is applied to the heating element.
5. A second measurement of temperature is accomplished before the expiration of the energy burst to accomplish continuous power if the sensor remains below set point temperature.

Thus, it can be seen that there is no discernable overshoot or hunting possible. It is to be noted that a 1/60 of a second burst of energy will change the temperature of the thermal system 2° C. divided by 60 or 0.033° C. Although this would not be discernable with averaging analog techniques within 16 milliseconds and certainly not by a human, the effect of the minute burst of energy is recognisable by the logic of the control circuitry. Consequently, the maximum temperature above set point can only be 0.03° C. It is further noticed that the sensor response, i.e., its change in degrees centigrade per second, is 33 times as responsive in time as compared to the temperature response of the thermal system as influenced by the heating element.

An advantage of this system is a very close control band, plus or minus 0.03° C., typical of what is expected from a high resolution control system, without the undesirable undulating effects normally associated with on/off control. To achieve such stability the customary method is to use expensive and bulky proportional control with anticipatory and reset features.

The principles of the invention are also useful in a mechanical energy system where the mechanical inertia is analogous to the thermal capacitance of a thermal system. In other words, a minimum burst of energy will change the inertia of the mechanical system very slightly and yet a second measurement of the momentum would be accomplished while the minimum burst is administered. For instance, a DC motor may be used with an AC power source, a Triac, and a rectifier. The Triac passes one complete cycle of 60 Hz power as a minimum burst to the motor and work. Therefore, the necessity for proportional power for steady state input of energy is unnecessary with resltant substantial savings in dollars and complexity. It is to be noted that the Triac is preferably turned on at zero voltage and is not turned on again until after the complete cycle of power reaches zero, unless a command is issued. The same change in momentum as a result of the 1/60 of a second of energy can be computed and will be discernable to the logic control.

Another important feature of such a control system where power is turned on at zero voltage is that undesirable high frequency noise is eliminated.

Apart from temperature systems, now it has been known that moisture content of certain products has been an important factor; however, extensive use of microwave monitoring, which signals will penetrate most any product other than a metal, is now available by the present invention because heretofore the cost per station or measuring has been prohibitive. The present system time shares the expensive portion of the circuit to make a multipoint monitoring and control porcess system practical.

For example, a known weight of roast beef in a microwave oven usually cooks in proportion to moisture loss. The most succulent roast known to man is one cooked at a very low temperature for a long period of time to maintain the moisture content high such as, for example, a roast placed in an oven turned to warm or 200° with the door left open and cooked all night. By employing the present invention in conjunction with a microwave oven, the magnitude of the microwave cooking power may be monitored and controlled to maintain the high moisture content desirable. This is done by utilizing a constant energy source and detecting the microwave energy emanating from the opposite side of the roast such that the absorbed microwave energy is the energy utilized in the cooking process and the residue or detected energy is monitored relative to a predetermined level of microwave energy to maintain the optimum microwave absorption, based upon a known curve of absorbed microwave energy versus time for a given moisture content for beef or other material even including wood.

With this type control a great number of microwave ovens can be operated at the same time to cook a great number of roasts with the circuitry enabling a single master control station to make comparisons to the same or different desired energy levels, according to the volume of roasts and type of meat being cooked.

As an input, the system requires an analog of the parameter being measured, which is time related to the value of the parameter, such as a crystal, which may be vibrating at a period proportional to pressure applied to it, its temperature or combination of both or possibly vibrating according to some other parameter such as the impinging radiation. This period of time may be used directly or after it is amplified, multiplied or divided. A second analog relative to the parameter may be a resistance change with either positive or negative co-efficient as long as it is predictable according to a linear or non-linear relationship. Such resistance changes are noticeable in measuring torque or force (strain gauge), weight, pressure (bourdon gauge) temperature (platinum or nickel RTD).

A third type sensor gives a voltage change which represents the parameter or change in the parameter according to a linear or non-linear relationship. An example of this is a variable-mu transformer or differential transformer which changes its output voltage according to a pressure or force exerted upon it.

The invention will be better understood from the following detailed description thereof when taken in conjunction with the following drawings, wherein:

FIG. 8 is a block diagram of an electrical energy switch to meter one cycle of AC power from power source to direct current motor.

FIG. 9 is a block diagram of a solid state power amplifier and rectifier.

Figure 1:
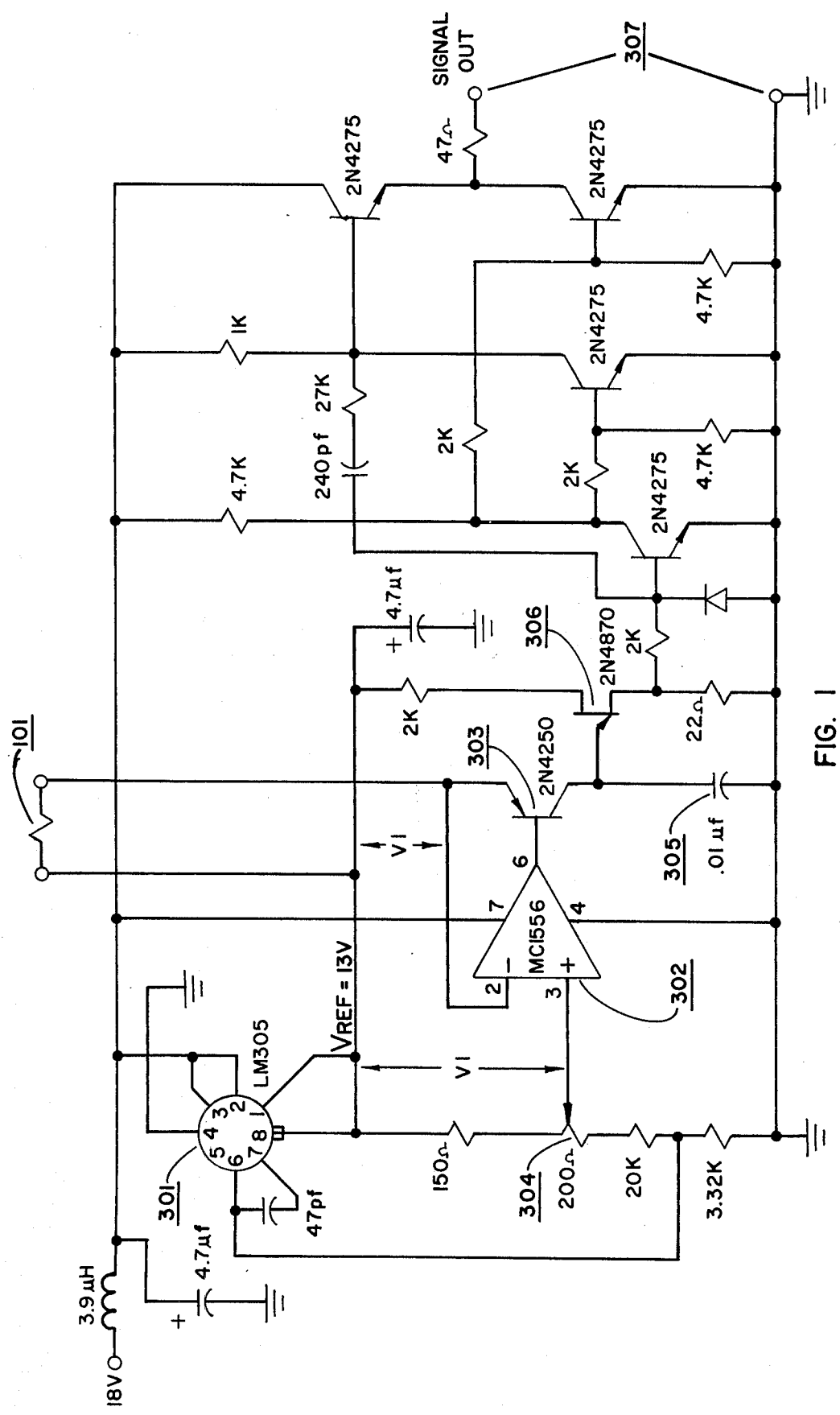
FIG. 1 is a circuit diagram of one type resistance to period transducer.

FIG. 1 is a circuit diagram for a resistance to period transducer in which the voltage regulator establishes a reference voltage of approximately 13 volts at pin 1. Voltage regulator 301 is an integrated circuit available as National LM305. The resistance sensor 101 controls a current source comprised of amplifier 302 (Motorola MC 1556), transistor 303 (2N4250), and a voltage divider network including variable resistor 304. The current source operates as follows: The voltage divider network, including resistor 304, establishes voltage VI between the reference voltage at pin 1 of regular 301 and pin 3 of amplifier 302. Since the voltage between pin 2 and pin 3 of amplifier 302 has to approach zero, the voltage VI is also present between the reference voltage at pin 1 of regulator 301 and pin 2 of amplifier 302 across the resistance sensor 101. Therefore, the voltage at pin 6 of amplifier 302 causes transistor 303 to maintain a current through the resistance sensor 101 and this maintains zero voltage between pin 2 and pin 3 of amplifier 302. Since the voltage across sensor 101 is constant, the current is proportional to the resistance ($I=V1/R$). Thus, the current at the collector of transistor 303 becomes proportional to the sensor resistance of sensor 101. It is this current which charges capacitor 305 until the voltage level across this capacitor triggers unijunction transistor 306.

The charge time of capacitor 305 is $T=(C\ Vt)/I$ wherein $C$ is the capacitance of capacitor 305, $Vt$ is the firing voltage of unijunction 306 and $I$ is the collector current of transistor 303. From the above equation, the period of the converter is $T=(Vt/V1)R$ which period is proportional to the sensor resistance. The remaining portion of the circuitry of FIG. 1 is standard output circuitry to match the impedance of the line to the controller and/or monitoring location (e.g., FIG. 7).

The output signal from the resistance to period transducer of FIG. 1 appears at terminals 307 and it is produced as a result of capacitor 305 being charged to the firing level of unijunction 306. Unijunction fires to discharge the capacitor which is recharged again under control of the sensor resistor 101 to produce a series of output spikes in the form of digital pulse train wherein the period between the spikes or "ones" is directly related to the resistance. Sensor resistor 101 may be an uncalibrated resistor because of the calibration adjustment of variable resistor 304 which sets the current level to produce a transfer of time at a known condition of the parameter which is causing the uncalibrated resistor 101 to change its value.

Any energy level sensor which gives a resistance change representing the change in the parameter being observed whether linear or non-linear as long as it is predictable serves as a suitable analog input to the resistance to period transducer of FIG. 1.

It is to be noted that any change in the uncalibrated resistor will produce the same change in period of any other non-calibrated resistance of a number of resistance to period transducers such that all have a change in period directly related to the change in energy level being observed. For example, if the resistor 101 is measuring the temperature of an energy system the uncalibrated resistance value will produce the correct current to the charging network at a certain temperature level (0° or 25° C) by adjusting variable resistor 304 to give a period output at 307 equal to a reference standard, i.e., variable resistor 304 is adjusted with resistance 101 at 0° C. to give 100 microseconds period at output 307. Therefore $$\frac{R1T}{R1o} = \frac{RNT}{RNo}$$

wherein R1T is the resistance value of R1 at a temperature other than zero and RNT is the resistance value of resistance N at the same temperature other than zero and wherein R1o and RNo are the resistance values of R1 and RN at 0° C. Therefore, it is concluded that the absolute value of the resistor R1 is not important in observing the parameter change of the energy system being observed. Regardless of the energy system affecting the value of sensor resistor 101, the resistance to period transducer circuitry is calibrated in similar fashion by adjusting variable resistor 304 to give a predetermined period of time at output 307 at a known energy level as related by the system's pressure, speed, temperature, etc.

The FIG. 1 circuitry provides a direct relationship between resistance of sensor 101 and the period of the pulse train 307: i.e., if the resistance increases, the period increases. Hence, a change in resistance of sensor 101 will cause a change in period of the output digital pulse train of terminals 307.

Many sensors in use today give an output voltage or an output current which will produce a voltage in conjunction with a precision resistor, proportional to the parameter change. To simplify the conversion to period of time proportional to the energy level change, the circuitry of FIG. 2 is used.

Figure 2:
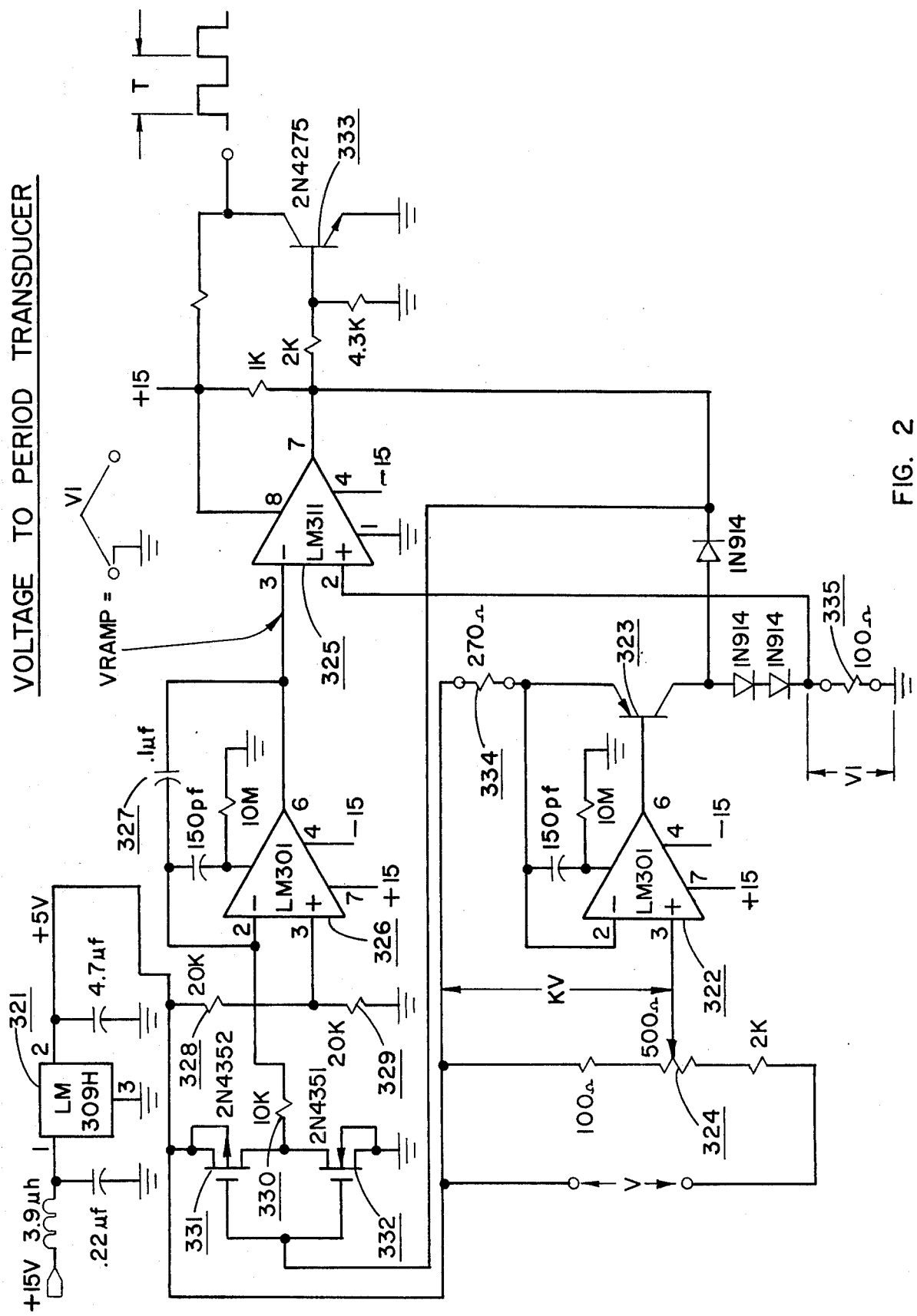
FIG. 2 is a circuit diagram of a voltage to period transducer.

Referring to FIG. 2, voltage regulator 321 (National LM309H) establishes a reference voltage of 5 volts at pin 2 of 321. This reference voltage is connected to an operational current source, formed by amplifier 322. This connection is at the top of voltage divider 324 and fixed resistor 334. The input voltage V, that varies as a function of parameter change is applied across voltage divider 324. A variable resistor is used to apply a fraction of the input voltage V between pin 2 of regulator 321 and pin 3 of amplifier 322. To keep the voltage between pin 2 and pin 3 of amplifier 322 at zero, pin 6 of 322 causes transistor 323 to conduct until the voltage at pin 2 of 322 equals the voltage of pin 3 of 322. This forms a constant current at the collector of 323 that is proportional to the input voltage. This current flows through resistor 335 forming voltage VI that is applied to pin 2 of comparator 325. The constant current $I = K(V/R1)$ where $K$ is fraction of input voltage, $V$ is input voltage, and $R1$ is resistor 334. Then $V1 = IR2$, where $R2$ is resistor 335. Therefore, $V1 = K(V/R1) R2 = KV(R2/R1)$, showing that voltage $V1$ is proportional to input voltage $V$.

Operational amplifier 326 (National LM101) is used as an integrator in which the charge time is given by: $T=2 (CV1)/I$ ($C$ is capacitance of capacitor 327, $I$ is input current given by $I=E/R$ ($E$ is fraction of reference voltage determined by voltage divider consisting of resistors 328 and 329, $R$ is input resistor 330.) The output of amplifier 326 is sent to comparator 325 pin 3 for comparison to Voltage V1 from resistor 335.

The two field effect switches 331 and 332 determine whether the output of amplifier 326 is increasing or decreasing.

To begin, assume switch 332 grounds one side of input resistor 330. This causes a linearly increasing output from amplifier 326 at pin 6. This output is sent to comparator 325 for comparison to voltage V1 from resistor 335. When the two are equal, comparator 325 causes the field effect switches to apply 5 volts to one side of input resistor 330 and simultaneously shunts the constant current from transistor 323 to ground by diode switching. This causes the voltage across resistor 335 to go to zero. When one side of input resistor 330 is connected to 5 volts by field effect switch 331, the output of amplifier 326 becomes a linearly decreasing signal that is compared to the voltage at resistor 1 which is at zero. When the output of 326 reaches zero, the cycle repeats itself.

Therefore the waveform at pin 6 of amplifier 326 is a ramp, i.e. a signal that increases linearly from zero until it equals V1, then it becomes a linearly decreasing until it equals zero. The output of comparator 325 changes states each time the output from amplifier changes slope. Therefore the output of comparator 325 is a square wave with a period proportional to parameter change and is sent to output transistor 333.

The period of the oscillator would be $T= 2(C V1)/I$, where $C$ is capacitor 327, $V1$ is voltage across resistor 335, and $I$ is current through input resistor 330. Substituting $V1 = (KV) (R2/R1)$ the results are $T = V (2KCR2)/(IR1)$. This shows that the period is proportional to the input voltage V.

The circuitry of FIG. 1 and FIG. 2 are an indirect resistance to period transducer because the element of time is inserted by the circuitry to arrive at the period for use in the remaining position of the system.

On the other hand, energy systems which are measured in terms of time already include this element and it need not necessarily be inserted by circuitry such as that of FIG. 1 and FIG. 2. For example, light is measured in wave lengths related to time: speed or angular velocity is measured in relation to time, whereas pressure for example, does not include the element of time. Radiant energy is usually measured in time and thus when heat is being radiated from a source, the period indicates the temperature of the source and in such fashion a direct transducer is employed in lieu of the circuitry of FIG. 1 and FIG. 2. The simplest form of a direct parameter to period device is a crystal which produces a frequency that changes in accordance with the pressure applied to the crystal. The output electrical signal includes the element of time without requiring its insertion by any timing circuit and the period of such a crystal may be used identically as the output pulse train appearing at terminals 307 of FIG. 1. The circuitry of FIG. 1 is shown in connection with the system of FIG. 7 with resistor 101 being identified as sensor 1 in the upper left hand corner and the remaining circuitry is illustrated by the box 102 designated as the period converter 1 so that terminals 307 feed the period signal to multiplexer 103.

Figure 3:
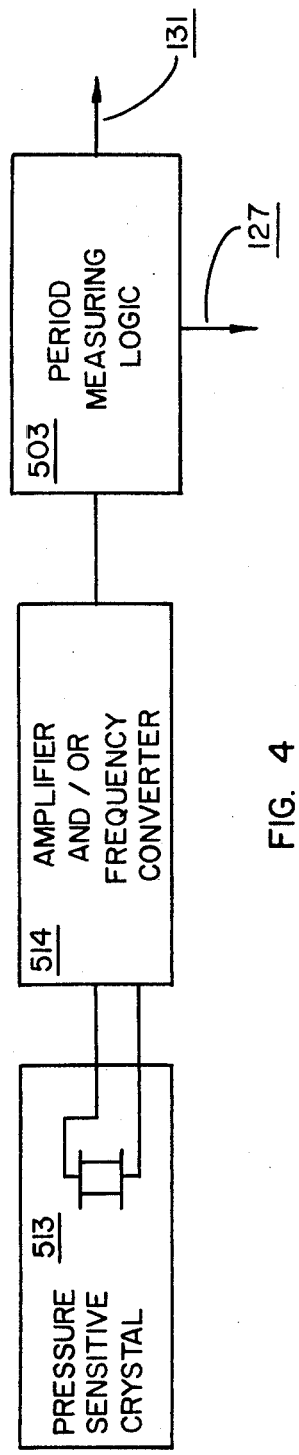
FIG. 3 is a block diagram of an indirect period transducer.

FIG. 3 illustrates in block form an indirect period transducer employing a strain gauge transducer 515 with the resistance of the strain gauge being shown at 515'. The resistance of the strain gauge, of course, varies in accordance with the pressure or force applied thereto. The resistive to period converter block 516 may be identical to the circuitry of FIG. 1 and its purpose is to produce an output signal with a period related to the magnitude of resistance exhibited by the strain gauge 515. This signal is applied to the period measuring logic 503, the purpose of which is to generate a gating signal having a time duration corresponding to the period so that a corresponding number of high frequency clock pulses can count down a stored predetermined digital number representing the desired pressure value. The residual number in the counter is indicative of the actual pressure as related to the desired pressure.

Figure 4:
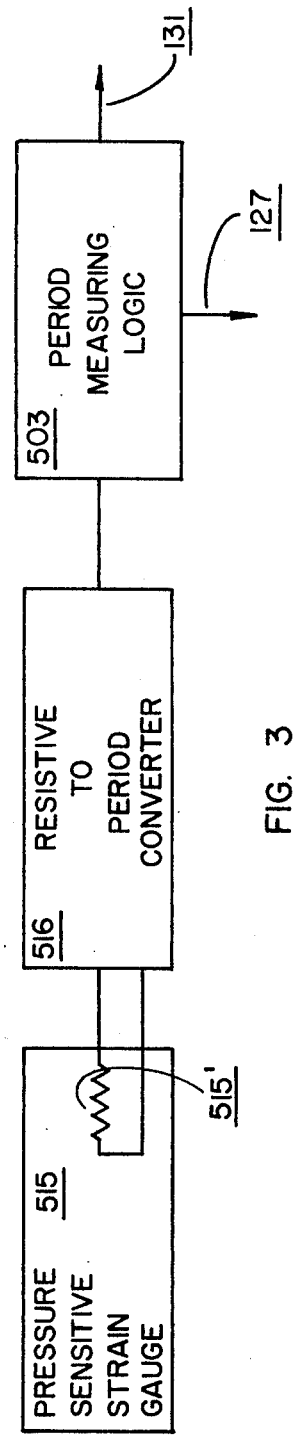
FIG. 4 is a block diagram of a direct period transducer.

In FIG. 4 there is shown a block illustration of a direct period transducer wherein pressure sensitive crystal 513 provides an output signal to amplifier and/or frequency converter 514 which amplifies the signal and/or converts it to a different frequency for application to the period measuring logic 503 just described. No resistive to period converter circuitry such as box 516 of FIG. 3 or the circuit of FIG. 1 is necessary because the crystal inherently induces the time element in the output signal of 514. The amplifier and/or frequency converter 514 may act as a translator to increase or decrease the frequency so that it is in the correct frequency band. Therefore, the period of 514 would be within the range of the system time constants.

Figure 5:
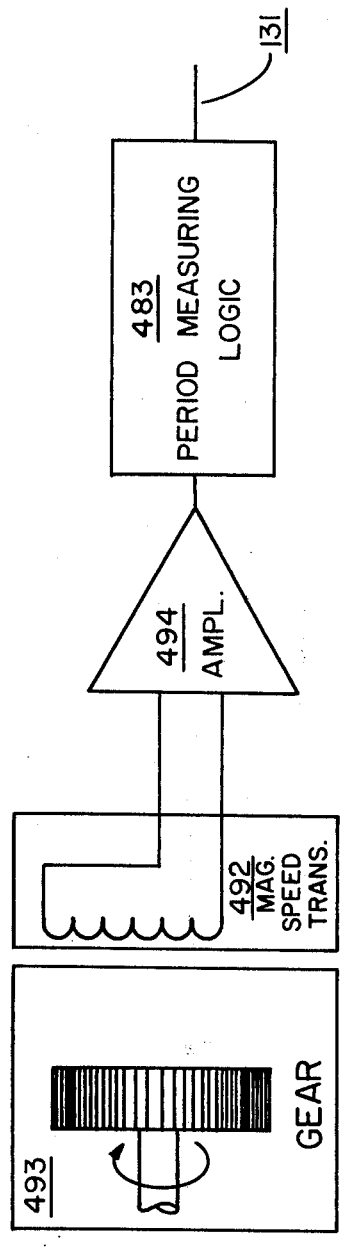
FIG. 5 is a block diagram of a direct angular velocity to period magnetic reluctance sensor.

FIG. 5 shows a different type direct period transducer and may be identified as a variable reluctance magnetic tachometer. Each time a tooth of gear 493 passes the magnetic speed transducer 492, an output pulse is applied to amplifier 494. Therefore, if the gear 493 is rotating a digital pulse train at the output of amplifier 494 has a period that is directly proportional to angular velocity, which is the parameter being controlled. Here, also, time is a factor in speed or angular velocity and need not be inserted by additional transducer circuitry.

Figure 7:
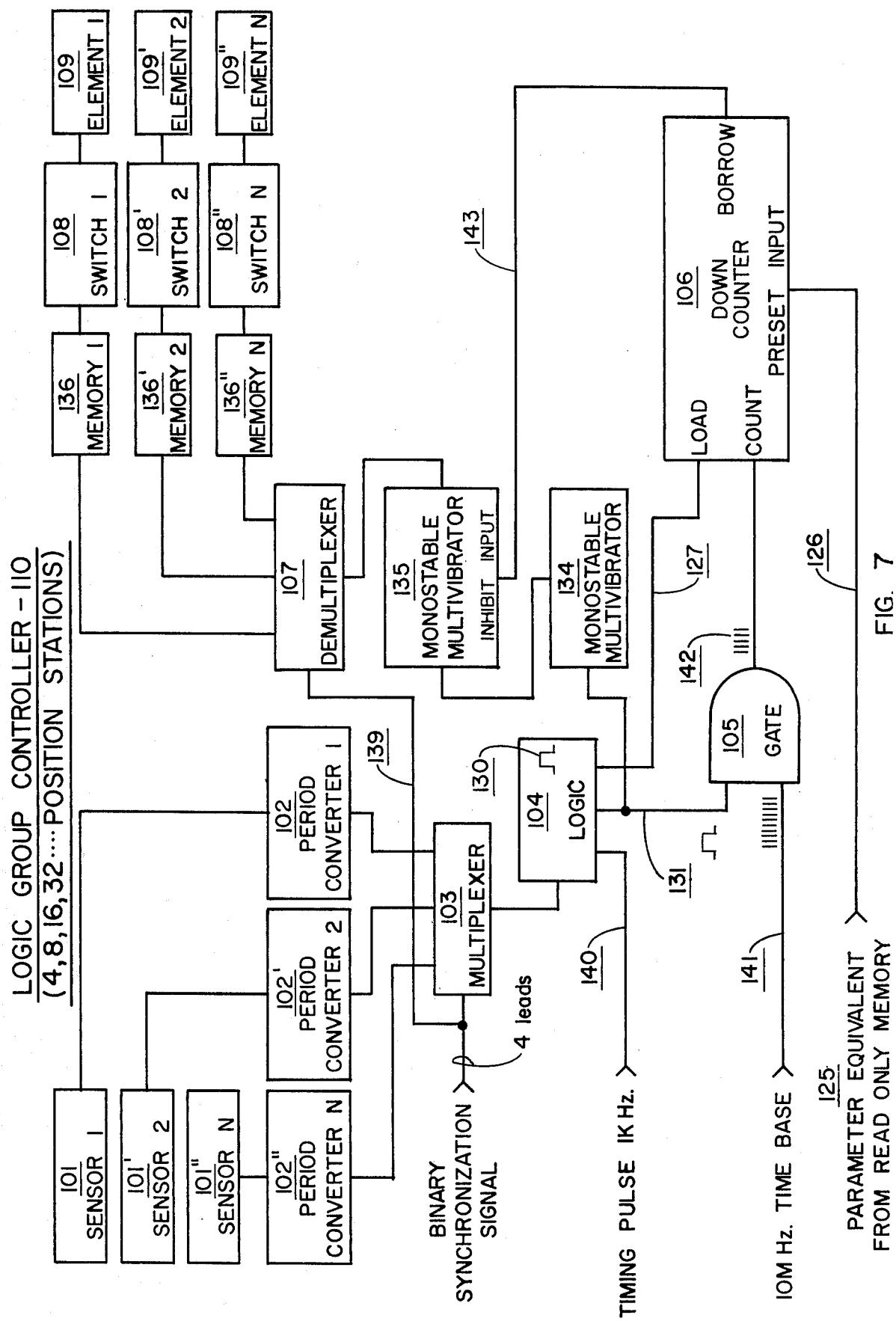
FIG. 7 is a block diagram of a logic group controller.

Referring to FIG. 7, we have generally described the unknown period input to multiplexer 103 of the group control (FIG. 7).

Figure 6:
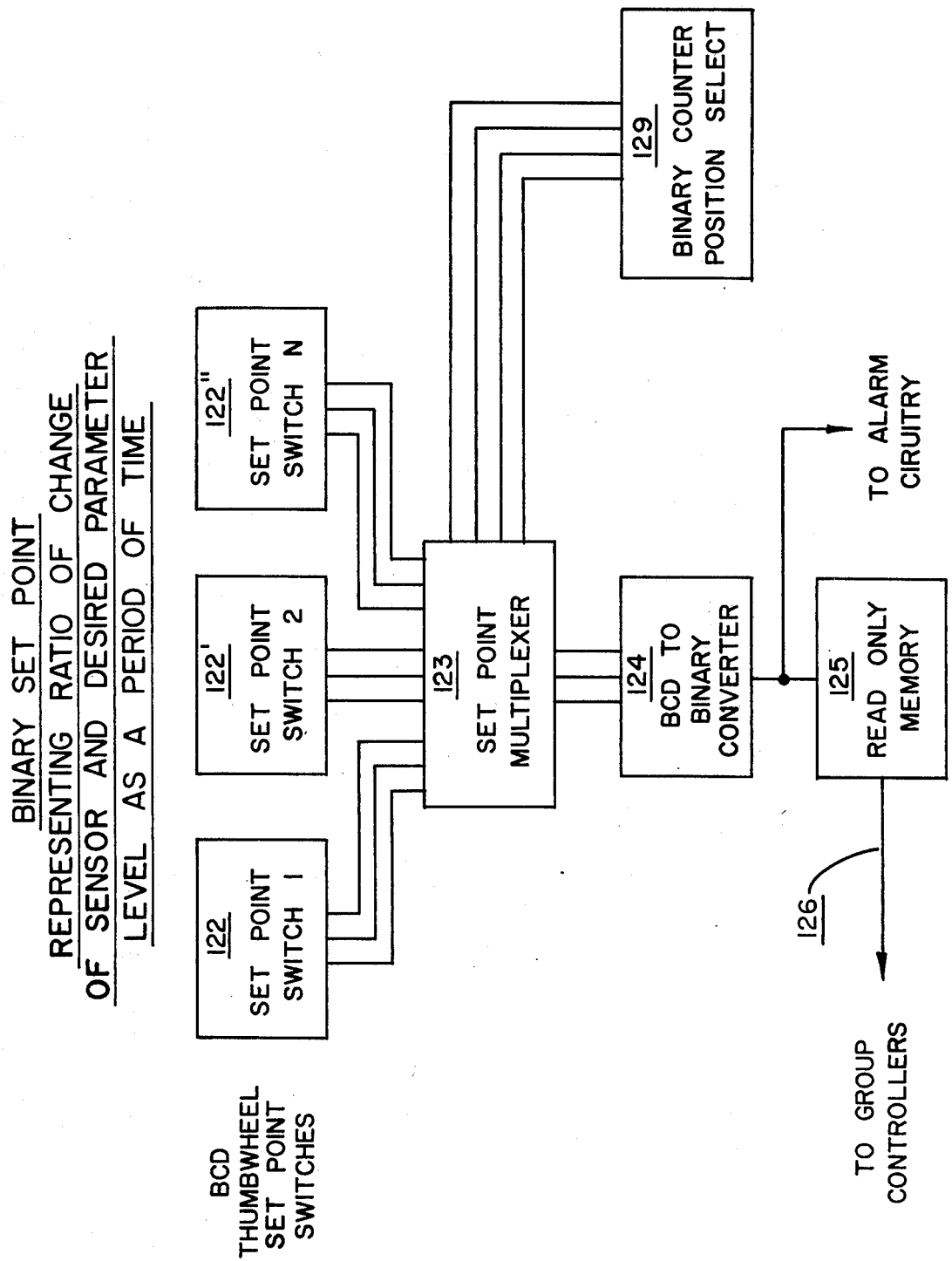
FIG. 6 is a block diagram of a binary set point representing ratio of change of sensor and desired parameter level as a period of time.

Before explaining the logic of the group control it is desirable to explain how the digital set point information is developed and introduced to the logic network. Referring to FIG. 6, the desired parameter set points are selected with thumb wheel indicating switches. There an be as many set points as there are positions in the group control, that is, four set points for four position; 16 set points for 16 positions, etc. These set points, which in this system are representative binary-coded-decimal numbers, are multiplexed by the set point multiplexer 123. Multiplexer 123, which is sequenced by the binary counter position select 129 which is also sequencing multiplexer 103, introduces the proper set point to BCD to binary converter 124. The binary information representing the set point goes directly to the alarm circuitry which is to be explained later and to read only memory circuitry 125. The output of the read only memory circuitry serves as the set point information for logic comparison to the unknown period 102. During each sampling period the output of memory 125 is applied to the group controller 110 or any number of group controllers or channels.

FIG. 7 is a group control wherein a plurality of sensors may sample a plurality of energy levels and share the same circuitry for processing the data from each pick up point to provide control of the energy applied to each load, read out information relative to the energy level of each load and alarm information for safety reasons.

First, the set point parameter level is predetermined by the operators (or it may come from a computer) and is registered in set point switches 122, 122' and 122'' as explained in connection with FIG. 6. The set point parameter is an address for the read only memory 125 of FIG. 6, which is storing the parameter information in incremental or point by point fashion, hence the set point parameter addresses the read only memory (memory) to locate a binary number corresponding to a ratio of the value of the sensor 101 at the set point parameter level to the value of the sensor 101 at the reference point. This number presents the desired period of digital pulse train developed by converter 102 as explained in FIGS. 1 and 2. Hence, the binary signal on line 126 sets the binary down counter 106 in response to a load command signal on lead 127 from logic circuit 104. Once the down counter 106 is loaded, a signal from one of the converters 102, 102', etc., may be applied via the multiplexer 103 to the logic circuit 104 to develop a pulse extending over a time interval the same as the period of the converter 102. Such a pulse is shown pictured as 130 in the logic block 104. This pulse is applied over lead 131 to AND gate 105 to open this gate for an amount of time corresponding to the signal period; i.e., the duration of the pulse 130. During this duration, gate 105 passes a quantity of pulses on lead 141 from the 10 MHZ time base 132 of FIG. 12. If this quantity of pulses are insufficient to count down counter to zero, a no-borrow signal is produced on output lead 143. The significance of the no-borrow signal is that more energy is needed to increase the signal period thereby increasing the number of clock pulses passing gate 105 to become at least equal to the count stored in counter 106 representative of the period of a non-existant pulse train which would be developed by sensing a parameter equal to the set point. The no-borrow signal is applied to monostable multivibrator 135 to the inhibit input thereof which will trigger as the result of the output from monostable multivibrator 134 after it times out.

The no-borrow signal does not inhibit multivibrator 135 so a command is sent by it to demultiplexer 107 which is controlled by the binary synchronization signal 139. This energy command is applied to one of, e.g. 16 memories 136, 136', etc., to signal the corresponding zero crossing solid state switch 108 to apply one cycle of power to energy element 109. The cycle of power may be expressed as the minimum discreet quantity of energy controlled by the present system. Switch 108 turns on only when the line voltage crosses zero, thereby eliminating high frequency noise, and of course, insuring that the standard full discreet quantity of metered energy will be applied.

Thus, each 16 position control channel (FIG. 7), by a time sharing technique, has its own logic circuitry to determine if the 16 parameters (usually energy levels) are below or above the desired set point level. The ROM number is loaded into the down counter 106 at the beginning of the scan period before the second "one" from the transducer being observes or interrogated occurs. It is this number which is counted down by the 10 MHZ time base pulses during the period between the second and third "one" of the transducer.

On the other hand, once the set point energy level has been attained, the period of the signal will equal or exceed the amount of time allotted for the set point value and hence completely count down the set point count stored in counter 106. In this event a borrow signal appears on lead 132 and fails to influence the remaining circuitry to call for more energy to element 109.

It is interesting to note that the system may run a secondary or load requiring additional heat or additional cold (air conditioning) and hence the terminology used to acquire the borrow or no borrow signal may be reversed if cold air is called for.

The element, 109 of FIG. 7 is a stationary resistive or inductive load. It is a heating element, a solenoid, the stationary portion of an Eddy current clutch or brake, or it is a single phase A-C motor.

Many mechanical energy systems are rotating and powered by direct current motors. The circuitry of FIG. 8 and FIG. 9 are used to apply a predetermined energy burst to a direct current motor.

In FIG. 8 the zero crossing switch output on line 159 is rectified by conventional solid state bridge rectifier 495 and is applied to the armature of direct current motor 165.

When it is desired to pulse existing proportioning circuitry or where further amplification of the power on line 159 is desirable, the conventional thyristor power amplifier circuitry of FIG. 9 is employed. The 230 volt A-C power is applied to a bridge 160 which contains two diodes and two thyristors. If a logical decision is made to apply power to motor 165', a signal is present in line 144'. Switch 489' applies one cycle of A-C voltage over line 159' to the primary winding of transformer 161. The two secondary windings of transformer 161 turn on the two thyristors in bridge 160 when they are alternately forward biased, thus applying one full cycle of Direct Current power to the armature of motor 165'.

Figure 10:
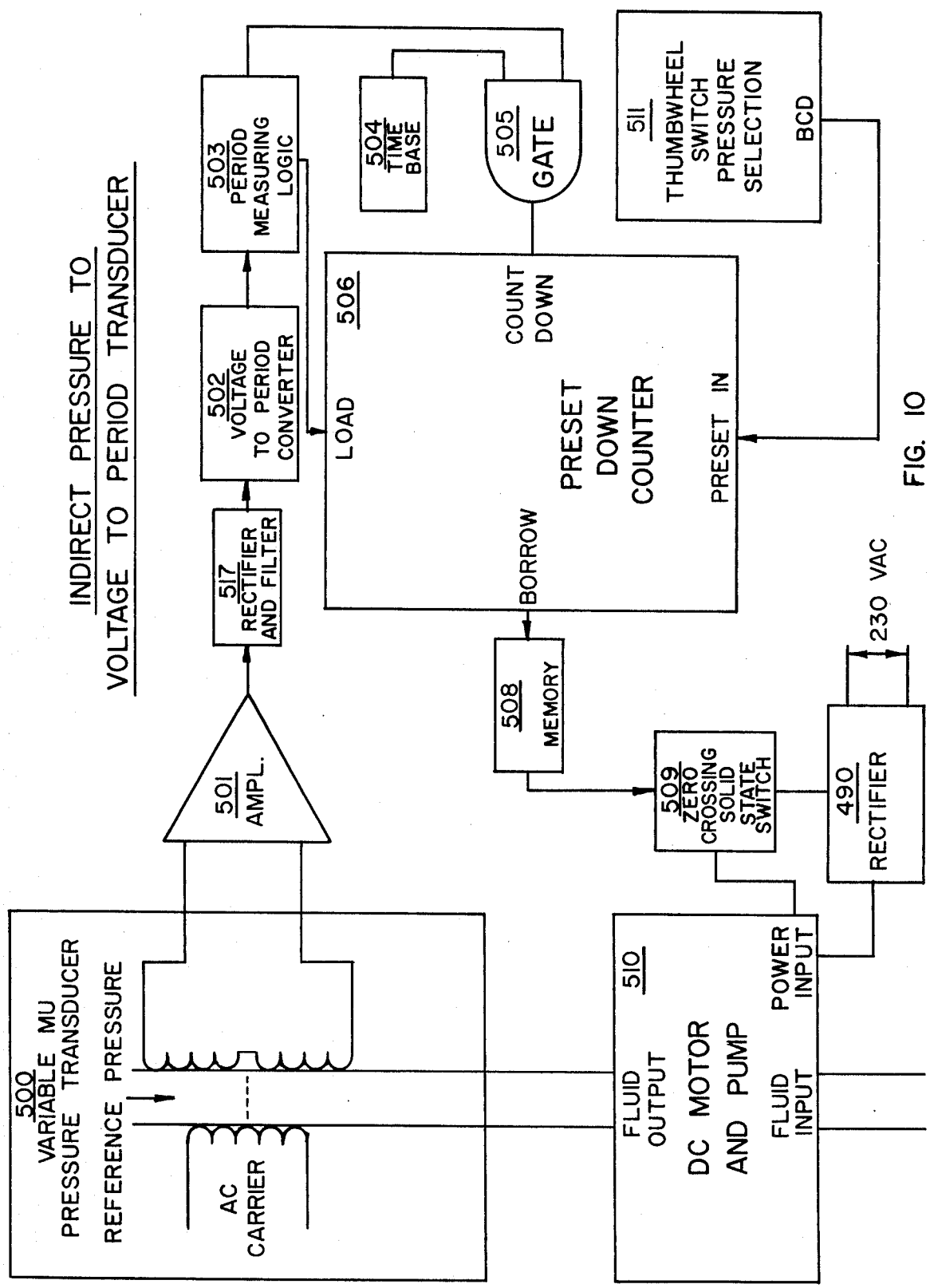
FIG. 10 is a block diagram of an indirect pressure to voltage period transducer.

If it is desired to accurately control fluid pressure, the arrangement of FIG. 10 is used. The pressure is compared by Variable Mu Pressue Transducer 500 to a reference pressure. An A-C carrier is applied to the primary winding of 500. The output A-C voltage of transducer 500, which increases with an increase in input pressure, is applied to amplifier 501. This output A-C voltage is rectified and filtered by rectifier and filter 517, and the resulting Direct Current voltage is applied to voltage to period converter 502. Period measuring logic 503 generates a pulse with a width that is the same as the time between two pulses at the output of converter 502.

The desired pressure is selected on thumbwheel switch 511 which applies a binary coded number to down counter 506. The pulse from logic 503 opens gate 505 for a time that is equal to the period of the output of converter 502, and allows a burst of high frequency pulses from time base 504 to count counter 506 down from the number preset by switch 511. If counter 506 does not count to zero, then the actual pressure is less than the desired pressure and a no-borrow signal is applied to memory 508. Memory 508 applies a signal to zero crossing switch 509, which applies one cycle of rectified A-C voltage to the direct current pump motor 510. Bridge rectifier 490 rectifies an A-C input voltage and applies a rectified voltage to switch 509.

Therefore, switch 509 applies power to pump motor 510 until the pressure is at the desired level. At this time the signal from logic 503 allows the time base 504 to count counter 506 to zero through gate 505. The block circuitry of FIG. 10 may be the same as already detailed herein.

Figure 11:
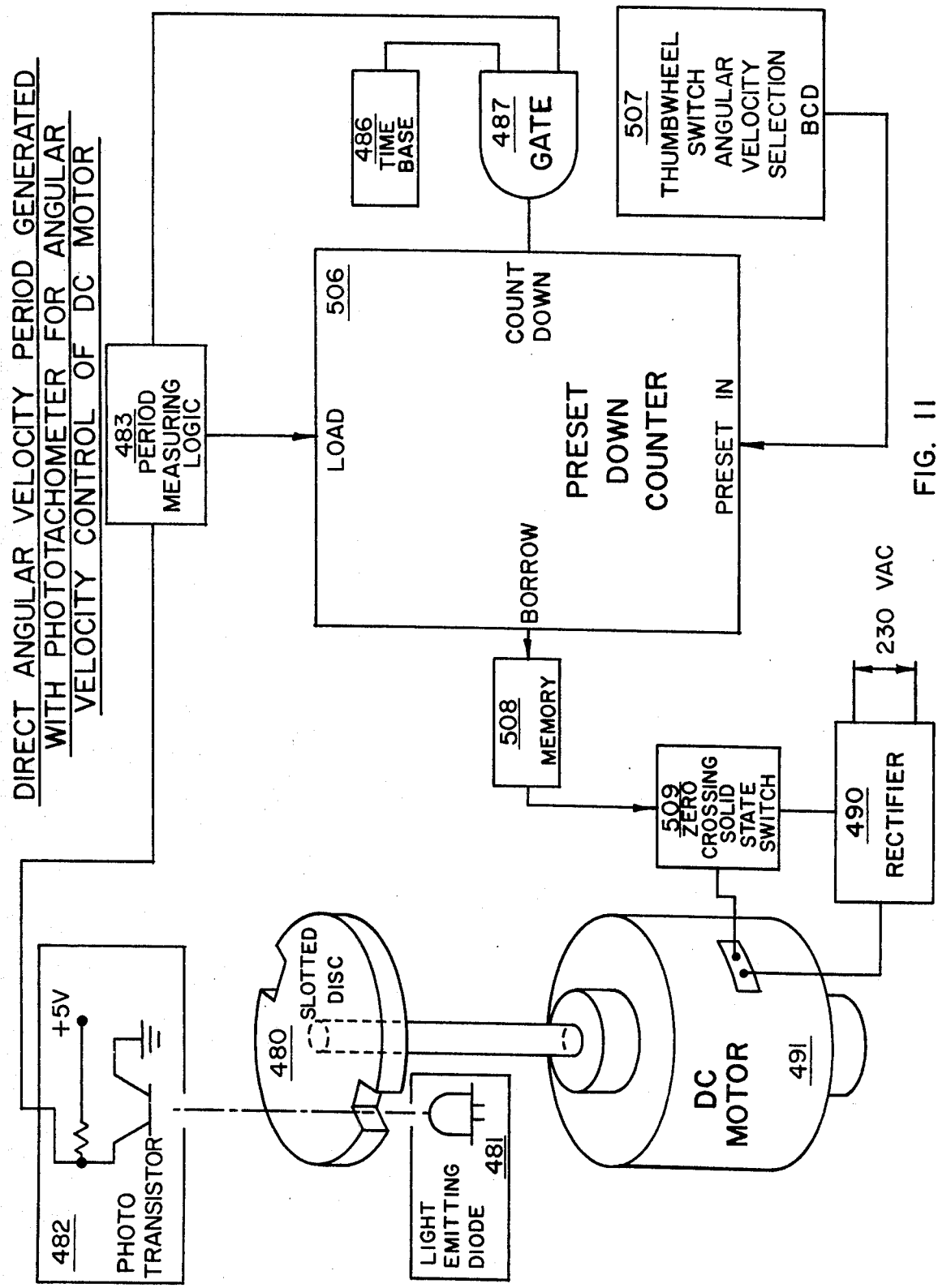
FIG. 11 is a block diagram of a direct angular velocity period generated with phototachometer for angular velocity control of DC motor.

FIG. 11 shows an arrangement for controlling angular velocity. Light from light emitting diode 481 travels through slots in slotted disc 480 and strikes phototransistor 482. This generates a pulse train at the collector of transistor 482 with a frequency proportional to angular velocity that is applied to period measuring logic 483. Logic 483 applies load signal to counter 506 which loads the binary coded decimal number from thumbwheel switch 507 into counter 506. The desired angular velocity is selected on thumbwheel 507. Logic 483 also generates a pulse with a width the same as the time between pulses of the output of transistor 482. This pulse from logic 483 opens and gate 487 and allows high frequency pulses from time base 486 to count counter 506 down. If counter 506 reaches zero, a borrow signal is applied to memory 508 which causes zero crossing switch 509 to apply one cycle of rectified power to Direct Current motor 491. Rectifier 490 supplied Direct Current power to switch 509. Power is applied in this fashion until counter 506 does not count to zero. This indicates that the period of the pulse train at the collector of transistor 482 is the same as desired, indicating proper or set angulara velocity.

Figure 12:
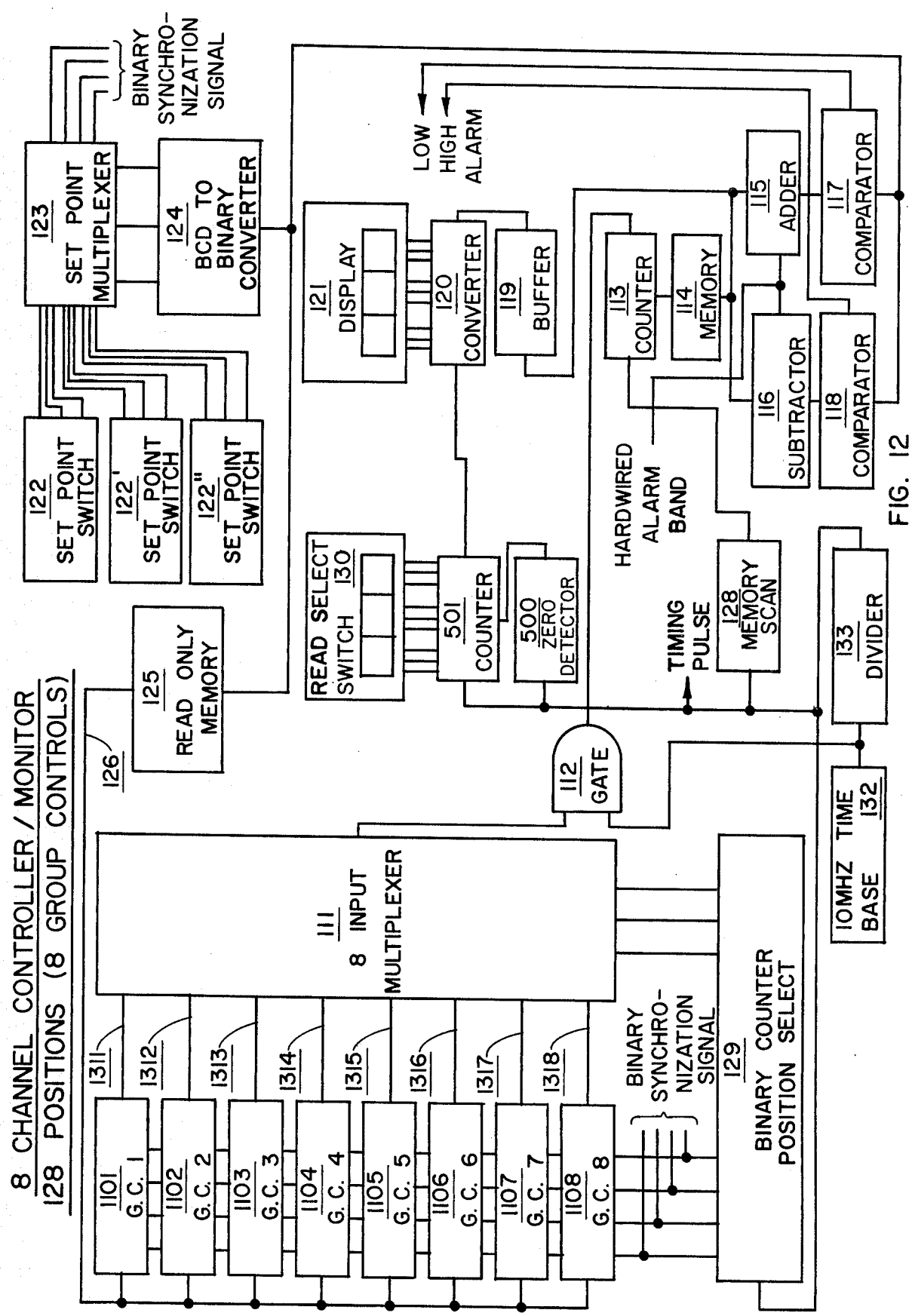
FIG. 12 is a block diagram of an eight channel controller/monitor.

FIG. 12 is a complete system for control, monitoring, and alarm in accordance with the present invention. The set point switches 122, 122', and 122'', the set point multiplexer 123, the converter 124, and the Read Only Memory 125 have been previously described and are shown in FIG. 6. Group Controls 1101, 1102, 1103, 1104, 1105, 1106, 1107, and 1108 also have been discussed previously and are shown in FIG. 7.

The total system operation is now described. During each scan period, the binary set point from Memory 125 is applied to the Group Controls 1101, 1102, 1103, 1104, 1105, 1106, 1107 and 1108 on line 126. The binary synchronization signal from counter 129 is also applied to the Group Controls, as previously described, for scanning the 16 positions controlled by each Group Control. The pulse generated by logic 104 and applied to line 131 of FIG. 7 is also applied to multiplexer 111 of FIG. 12 on lines 1311, 1312, 1313, 1314, 1315, 1316, 1317, and 1318 during each scan period. Multiplexer 111 is also controlled by binary counter 129, therefore, multiplexer 111 samples a pulse that is equal to the period of one of up to 128 converters 102 of FIG. 7 during each scan period. In other words, each multiplexer 103 of FIG. 7 is scanning 16 converters 102 of FIG. 7 and the resultant output pulse is on line 131 of FIG. 7. This pulse is on lines 1311, 1312, 1313, 1314, 1315, 1316, 1317, and 1318 of FIG. 12. Then multiplexer 111 of FIG. 12 is scanning 128 converters.

The sequence of events that occur during one scan period is now explained. The pulse of multiplexer 111 is applied to AND gate 112 of FIG. 12 which allows high frequency pulses from time base 132 to pass during the length of the pulse. Counter 113, which was previously reset to zero by memory scan logic 128, receives the burst of high frequency pulses from gate 112 and counts to a binary number that is equivalent to the width of the pulse from multiplexer 111. The binary number stored in counter 113 is applied to memory 114 as an address. Memory 114 is necessary if the energy level transducer is non-linear. At the addressed location in memory 114 is a binary number corresponding to the energy level of the variable being controlled and or monitored. The output of memory 114 is used for two purposes, alarm and display. The binary number of memory 114 is applied to subtractor 116 and adder 115 which subtract and add a predetermined alarm band number. The outputs of 115 and 116 are applied to comparators 117 and 118 for comparison to the binary number representing the desired energy level from converter 124. If the number from memory 114 is out of predetermined tolerance levels, an alarm signal is sent from comparator 117 and 118.

The binary number representation of energy level from memory 114 is also sent to buffer 119 to be displayed if the desired position is being scanned. The position number to be displayed is selected on thumbwheel switch 139 and the binary coded decimal output from 130 is loaded into down counter 501 when the binary counter position select 129 scans zero position, as determined by zero detector 500. When counter 129 counts to and is scanning the position selected by switch 130, counter 501 has counted down to zero since both counter 129 and counter 501 are counted by the same pulse train from divider 133. When counter 501 counts to zero, a borrow pulse is sent out and this pulse is applied to binary-to-binary-coded-decimal converter 120 to initiate conversion. The binary number in buffer 119 is converted to a binary coded decimal equivalent by converter 120 and this number is applied to display 121 for readout.

The high frequency pulse train is divided by divider 133 and the output from 133 is used as a timing pulse throughout the system.

What is claimed is:

1. A method for supervising energy systems in ON/OFF fashion by controlling the energy application to maintain a desired energy level comprising the steps of:
    predetermining the desired energy level by establishing it as a number;
    sensing the actual energy level of the system by exposing a variable output sensor means thereto for output variation in accordance with the sensed energy level;
    converting the variable output to an adjustable pulse train with the time period between pulses being proportional to the energy level being sensed;
    storing numbers having values in accordance with the ratios of sensor output variable values at the energy levels to be sensed to the sensor output value at a reference energy level, with said ration numbers being retrievable respectively against the desired energy level number;
    selecting from the stored ratio numbers the predetermined desired energy level number;
    establishing a reference standard time base as a source of clock pulses;
    selecting that number of clock pulses from the time base occurring during the period between adjacent pulses of the pulse train;
    determining if the selected number of clock pulses is greater than, equal to, or less than the selected number; and,
    applying energy if required.

2. Apparatus for supervising energy systems in ON/OFF fashion by controlling the energy application to maintain a desired energy level comprising, in combination:
    means for predetermining the desired energy level by establishing it as a number;
    means for sensing the actual energy level of the system by exposing a variable output sensor means thereto for output variation in accordance with the sensed energy level;
    means for converting the variable output to an adjustable pulse train with the time period between pulses being proportional to the energy level being sensed;
    means for storing numbers having values in accordance with the ratios of sensor output variable values at the energy levels to be sensed to the sensor output value at a reference energy level, with said ratio numbers being retrievable respectively against the desired energy level number;
    means for selecting from the stored ratio numbers the predetermined desired energy level number;
    means for establishing a reference standard time base as a source of clock pulses;
    means for selecting that number of clock pulses from the time base occurring during the period between adjacent pulses of the pulse train;
    means for determining if the selected number of clock pulses is greater than, equal to, or less than the selected number; and,
    means for applying energy if required.

3. The apparatus of claim 2 wherein;
    said means for predetermining are switched and the number is represented in binary coded decimal;
    said means for sensing is a resistance;
    said desired energy level is a temperature;
    said means for converting is an adjustable oscillator; and,
    said means for selecting is a logic circuit.

4. The apparatus of claim 2 wherein;
    said means for sensing is an uncalibrated resistance;
    said means for converting is adjustable whereby a predetermined time interval is set at a known energy level; and,
    said desired energy level is a temperature.

5. The apparatus of claim 2 wherein said energy levels are pressures and the sensor variable is resistance or voltage.

6. The apparatus of claim 2 wherein:
    the sensor means variable output is a voltage;
    said desired energy level is pressure;
    said means for converting is an oscillator; and,
    said means for selecting is a logic circuit.

7. The method of claim 1 wherein energy application is applied in discrete equal units of energy, each unit of which only slightly affects the actual energy level and is small compared to the predetermined energy level.

8. The method of claim 1 comprising the further step of storing the results of the determination to maintain energy application for a predetermined time period which is in excess of the time required for at least one determination.

9. The method of claim 1 including the further step of multiplexing pulse trains respectively associated with more than one energy level for comparison and application to the associated energy system.

10. A method for monitoring energy systems by indicating an unknown energy level by using a ratio change of sensor output comprising the steps of:
   storing numbers having values in accordance with the ratios of sensor output variable values at the energy levels to be sensed to the sensor output value at a reference energy level, with said ratio numbers corresponding to unknown energy levels to be indicated;
   sensing the actual energy level of the system by exposing a variable output sensor means thereto for output variation in accordance with the sensed energy level;
   converting the variable output to an adjustable pulse train with the time period between pulses being proportional to the energy level being sensed;
   establishing a reference standard time base as a source of clock pulses;
   selecting that number of clock pulses from the time base occurring during the period betwen adjacent pulses of the pulse train;
   counting the selected number of clock pulses to develop a ratio number; and,
   indicating from the stored numbers the unknown energy level corresponding to said ratio number.

11. Apparatus for monitoring energy systems by indicating an unknown energy level by using a ratio change of sensor output comprising:
   means for storing numbers having values in accordance with the ratios of sensor output variable values at the energy levels to be sensed to the sensor output value at a reference energy level, with said ratio numbers corresponding to unknown energy levels to be indicated;
   means for sensing the actual energy level of the system by exposing a variable output sensor means thereto for output variation in accordance with the sensed energy level;
   mans for converting the varaible output to an adjustable pulse train with the time period between pulss being proportional to the energy level being sensed;
   mean for establishing a reference standard time base as a source of clock pulses;
   means for selecting that number of clock pulses from the time base occurring during the period between adjacent pulses of the pulse train;
   means for counting the selected number of clock pulses to develop a ratio number; and,
   means for indicating from the stored numbers the unknown energy level corresponding to said ratio number.

12. The apparatus of claim 11 wherein:
   said means for sensing is a resistance;
   said unknown energy level is a temperature; and,
   said means for converting is an oscillator, 13. The apparatus of claim 11 wherein:
   said means for sensing is an uncalibrated resistance;
   said unknown energy level is a temperature; and,
   said means for converting is adjustable whereby a predetermined tine interval is set at a known temperature.

14. The apparatus of claim 11 wherein said energy levels are pressures and the sensor variable is resistance or voltage.

15. The apparatus of claim 11 wherein:
   the sensor variable output is a voltage;
   said unknown energy level is pressure; and,
   said means for converting is an oscillator.

16. A method for monitoring energy systems to develop alarms when the system energy level is beyond a predetermined band of energy levels by using a ratio change of sensor output comprising the steps of:
   establishing a desired energy level as a number;
   storing numbers having vaues in accordance with the ratios of sensor output variable values at the energy levels to be sensed to the sensor output value at a reference energy level, with said ratio numbers corresponding to energy levels to be alarmed;
   sensing the actual energy level os the system by exposing a variable output sensor means thereto for output variation in accordance with the sensed energy level;
   converting the variable output to an adjustable pulse train with the time period between pulses being proportional to the energy level being sensed;
   establishing a reference standard time base as a source of clock pulses;
   selecting that number of clock pulses from the time base occurring during the period between adjacent pulses of the pulse train;
   counting the selected number of clock pulses to develop a ratio number;
   obtaining a number corresponding to said ratio number;
   adding a predetermined number to said corresponding number;
   comparing the result of the addition to the set point number;
   alarming if the set point number is higher than the resulting number;
   subtracting a predetermined number from said corresponding number;
   comparing the result of the subtraction to the set point number; and,
   alarming if the set point number is lower than the resulting number.

17. Apparatus for monitoring energy systems by indicating an unknown energy level by using a ratio change of sensor output comprising:
   means for establishing a desired energy level as a number.
   means for storing numbers having values in accordance with the ratios of sensor output variable values at the energy levels to be sensed to the sensor output value at a reference energy level, with said ratio numbers corresponding to unknown energy levels to be indicated;
   means for sensing the actual energy level of the system by exposing a variable output sensor means thereto for output variation in accordance with the sensed energy level;
   means for converting the variable output to an adjustable pulse train with the time period between pulses being proportional to the energy level being sensed;
   means for establishing a reference standard time base as a source of clock pulses;
   means for selecting that number of clock pulses from the time base ocurring during he period between adjacent pulses of the pulse train;
   means for counting the selected number of clock pulses to develop a ratio number;

means for obtaining a number corresponding to said ratio number;

means for adding a predetermined number of said corresponding number;

means for comparing the result of the addition to the set point number;

means for alarming if the set point number is higher than the resulting number;

means for subtracting a predetermined number from said corresponding number;

means for comparing the result of the subtraction to the set point number; and, means for alarming if the set point number is lower than the resulting number.

18. The apparatus of claim 17 wherein:
said means for predetermining are switches and the number is represented in binary coded decimal;
said means for sensing is a resistance;
said desired energy level is a temperature;
said means for converting is an adjustable oscillator; and,
said means for selecting is a logic circuit.

19. The apparatus of claim 17 wherein:
said means for sensing is an uncalibrated resistance;
said means for converting is adjustable whereby a predetermined time interval is set at a known energy level; and,
said desired energy level is a temperature.

20. The apparatus of claim 17 wherein said energy levels are pressures and the sensor variable is resistance or voltage.

21. The apparatus of claim 17 wherein:
the sensor means variable output is a voltage;
said desired energy level is pressure;
said means for converting is an oscillator; and,
said means for selecting is a logic circuit.

22. A method for monitoring energy levels to determine if a load is operating above, at, or below a predetermined energy level comprising the steps of:
exposing sensor means to the load to sense the level of energy operation thereof and produce a variable output in accordance with variation of said energy level;
producing a pulse train in the form of said variable output wherein the period time interval between pulses of said train is indicative of the energy level being sensed;
adjusting the producing of said pulses by establishing a predetermined time interval between adjacent pulses at a known energy level for said sensing and thereafter proportionately modifying the production of all pulses;
storing values in accordance with the ratio of sensor value at the levels to be sensed to the sensor value at a reference level;
producing many clock pulses in the least time interval to be encountered between said train pulses;
selecting the number of clock pulses occurring during an interval between adjacent pulses of said train; and,
comparing the number of clock pulses selected with the ratio number stored in said memory indicative of said predetermined energy level.

23. Apparatus for monitoring energy levels to determine if a load is operating above, at, or below a predetermined energy level comprising:
sensor means exposed to the load to sense the level of energy operation thereof and produce a variable output in accordance with variation of said energy level;
said sensor means comprising a sensor and means for producing a pulse train in the form of said variable output wherein the period time interval between pulses of said train is indicative of the energy level being sensed;
said means for producing being adjustable whereby a predetermined time interval is set between adjacent pulses at a known energy level for said sensor;
a memory having values stored therein in accordance with the ratio of sensor value at the levels to be sensed to the sensor value at a reference level;
a clock producing many clock pulses in the least time interval to be encountered between said train pulses;
means for selecting the number of clock pulses occurring during an interval between adjacent pulses of said train; and,
means for comparing the number of clock pulses selected with the ratio number stored in said memory indicative of said predetermined energy level.

24. The apparatus of claim 23 wherein:
said sensor means is a resistance;
said predetermined energy level is a temperature;
said means for producing is an adjustable oscillator; and,
said means for selecting is a logic circuit.

25. The apparatus of claim 23 wherein:
said sensor means is an uncalibrated resistance;
said predetermined energy level is a temperature; and.
said predetermined time interval is selected for a value of sensor resistance at a known temperature.

26. The apparatus of claim 23 wherein said energy levels are pressures and the sensor variable is resistance or voltage.

27. The apparatus of claim 23 wherein:
the sensor variable output is a voltage;
said predetermined energy level is pressure;
said means for producing is an adjustable oscillator; and,
said means for selecting is a logic circuit.

28. A method for supervising energy systems in ON/OFF fashion by controlling the energy application to maintain a desired energy level comprising the steps of:
predetermining the desired energy level by establishing it as a number;
sensing the actual energy level of the system by exposing a variable frequency output sensor means thereto for output frequency variation in accordance with the sensed energy level;
frequency converting the variable output to a pulse train with the time period between pulses being proportional to the energy level being sensed;
storing numbers having values in accordance with the ratios of sensor output variable values at the energy levels to be sensed to the sensor output value at a reference energy level, with said ratio numbers being retrievable rspectively against the desired energy level number;
selecting from the stored ratio numbers the predetermined desired energy level number;
establishing a reference standard time base as a source of clock pulses;
selecting that number of clock pulses from the time base occurring during the period between adjacent pulses of the pulse train;

determining if the selected number of clock pulses is greater than, equal to, or less than the selected number; and, applying energy is required.

29. Apparatus for supervising energy systems in ON-/OFF fashion by controlling the energy application to maintain a desired energy level comprising, in combination:

means for predetermining the desired energy level by establishing it as a number;

means for sensing the actual energy level of the sytem by exposing a variable frequency output sensor means thereto for output frequency variation in accordance with the sensed energy level;

means for frequency converting the variable output to a pulse train with the time period between pulses being proportional to the energy level being sensed;

means for storing numbers having values in accordance with the ratios of sensor output variable values at the energy levels to be sensed to the sensor output value at a reference energy level, with said ratio numbers being retrievable respectively against the desired energy level number;

means for selecting from the stored ratio numbers the predetermined desired energy level number;

means for establishing a reference standard time base as a source of clock pulses;

means for selecting that number of clock pulses from the time base occurring during the period between adjacent pulses of the pulse train;

means for determining if the selected number of clock pulses is greater than, equal to, or less than the selected number; and, means for applying energy if required.

30. The apparatus of claim 29 wherein:

said means for predetermining are switches and the number is represented in binary coded decimal;

said means for sensing is a crystal; and, said predetermined energy level is a pressure.

31. A method for monitoring energy systems by indicating an unknown energy level by using a ratio change of sensor output comprising the steps of:

storing numbers having values in accordance with the ratios of sensor output variable values at the energy levels to be sensed to the sensor output value at a reference energy level, with said ratio numbers corresponding to unknown energy levels to be indicated;

sensing the actual energy level of the system by exposing a variable frequency output sensor means thereto for output frequency variation in accordance with the sensed energy level;

frequency converting the variable output to a pulse train with the time period between pulses being proportional to the energy level being sensed;

establishing a reference standard time base as a source of clock pulses;

selecting that number of clock pulses from the time base occurring during the period between adjacent pulses of the pulse train;

counting the selected number of clock pulses to develop a ratio number; and, indicating from the stored numbers the unknown energy level corresponding to said ratio number.

32. Apparatus for monitoring energy systems by indicating an unknown energy level by using a ratio change of sensor output comprising:

means for storing numbers having values in accordance with the ratios of sensor output variable values at the energy levels to be sensed to the sensor output value at a reference energy level, with said ratio numbers corresponding to unknown energy levels to be indicated;

means for sensing the actual energy level of the system by exposing a variable frequency output sensor means thereto for output frequency variation in accordance with the sensed energy level;

means for frequency converting the variable output to a pulse train with the time period between pulses being proportional to the energy level being sensed;

means for establishing a reference standard time base as a source of clock pulses;

means for selecting that number of clock pulses from the time base occurring during the period between adjacent pulses of the pulse train;

means for counting the selected number of clock pulses to develop a ratio number; and, means for indicating from the stored numbers the unknown energy level corresponding to said ratio number.

33. The apparatus of claim 32 wherein:

said means for sensing is a crystal; and, said unknown energy level is a pressure.

34. A method for monitoring energy systems to develop alarms when the system energy level is beyond a predetermined band of energy levels by using a ratio change of sensor output comprising the steps of:

establishing a desired energy level as a number;

storing numbers having values in accordance with the ratios of sensor output variable values at the energy levels to be sensed to the sensor output value at a reference energy level, with said ratio numbers corresponding to energy levels to be alarmed;

sensing the actual energy level of the system by exposing a variable frequency output sensor means thereto for output frequency variation in accordance with the sensed energy level;

frequency converting the variable output to a pulse train with the time period between pulses being proportional to the energy level being sensed;

establishing a reference standard time base as a source of clock pulses;

selecting that number of clock pulses from the time base occurring during the period between adjacent pulses of the pulse train;

counting the selected number of clock pulses to develop a ratio number;

obtaining a number corresponding to said ratio number;

adding a predetermined number to said corresponding number;

comparing the result of the addition to the set point number;

alarming if the set point number is higher than the resulting number;

subtracting a predetermined number from said corresponding number;

comparing the result of the subtraction to the set point number; and, alarming if the set point number is lower than the resulting number.

35. Apparatus for monitoring energy systems by indicating an unknown energy level by using a ratio change of sensor output comprising:

means for establishing a desired energy level as a number;
means for storing numbers having values in accordance with the ratios of sensor output variable values at the energy levels to be sensed to the sensor output value at a reference energy level, with said ratio numbers corresponding to unknown energy levels to be indicated;
means for sensing the actual energy level of the system by exposing a variable frequency output sensor means thereto for output frequency variation in accordance with the sensed energy level;
means for frequency converting the variable output to a pulse train with the time period between pulses being proportional to the energy level being sensed;
means for establishing a reference standard time base as a source of clock pulses;
means for selecting that number of clock pulses from the time base occurring during the period between adjacent pulses of the pulse train;

means for counting the selected number of clock pulses to develop a ratio number;
means for obtaining a number corresponding to said ratio number;
means for adding a predetermined number to said corresponding number;
means for comparing the result of the addition to the set point number;
means for alarming if the set point number is higher than the resulting number;
means for subtracting a predetermined number from said corresponding number;
means for comparing the result of the subtraction to the set point number; and,
means for alarming if the set point number is lower than the resulting number.

36. The apparatus of claim 35 wherein:
said means for sensing is a crystal; and,
said desired energy level is a pressure.

* * * * *